United States Patent [19]
Tamaru et al.

[11] 3,831,155
[45] Aug. 20, 1974

[54] NONVOLATILE SEMICONDUCTOR SHIFT REGISTER

[75] Inventors: Keikichi Tamaru; Isao Nojima; Yukimasa Uchida, all of Yokohama, Japan

[73] Assignee: Tokyo Shibaura Electric Co., Ltd., Kawasaki-shi, Japan

[22] Filed: Dec. 29, 1972

[21] Appl. No.: 319,358

[30] Foreign Application Priority Data

Dec. 29, 1971 Japan .................................. 46-702
Dec. 29, 1971 Japan .................................. 46-2061

[52] U.S. Cl. ............... 340/173 R, 307/291, 328/37, 340/173 LI
[51] Int. Cl. .......................................... G11c 11/40
[58] Field of Search .... 340/174 SR, 173 R, 173 FF; 328/37; 307/291

[56] References Cited

UNITED STATES PATENTS

| | | | |
|---|---|---|---|
| 2,974,311 | 3/1961 | Kauffmann | 340/174 SR |
| 3,573,754 | 4/1971 | Merryman | 328/37 |
| 3,609,393 | 9/1971 | Yao | 328/37 |

*Primary Examiner*—Terrell W. Fears
*Attorney, Agent, or Firm*—Flynn & Frishauf

[57] ABSTRACT

A shift register comprises as one of two shift register halves, a permanent or nonvolatile memory element including a nonvolatile semiconductor element and, as the other shift register half, a temporary or volatile memory element including a conventional flip-flop circuit or a capacitance. A switching element is connected between the permanent memory element and the temporary memory element.

A plurality of shift register stages including the permanent and temporary memory elements and, the switching element are cascade arranged through respective coupling elements. According to the shift register so constructed, any binary coded input signal is shifted from stage to stage and even after the cut-off of a power source, information stored in each permanent memory element can be retained without being extinguished.

6 Claims, 27 Drawing Figures

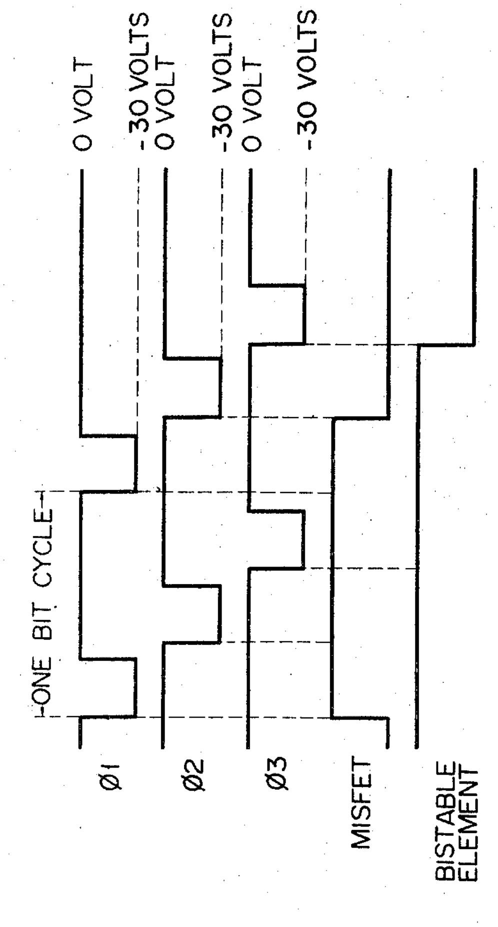
FIG. 8A
FIG. 8B
FIG. 8C
FIG. 8D
FIG. 8E
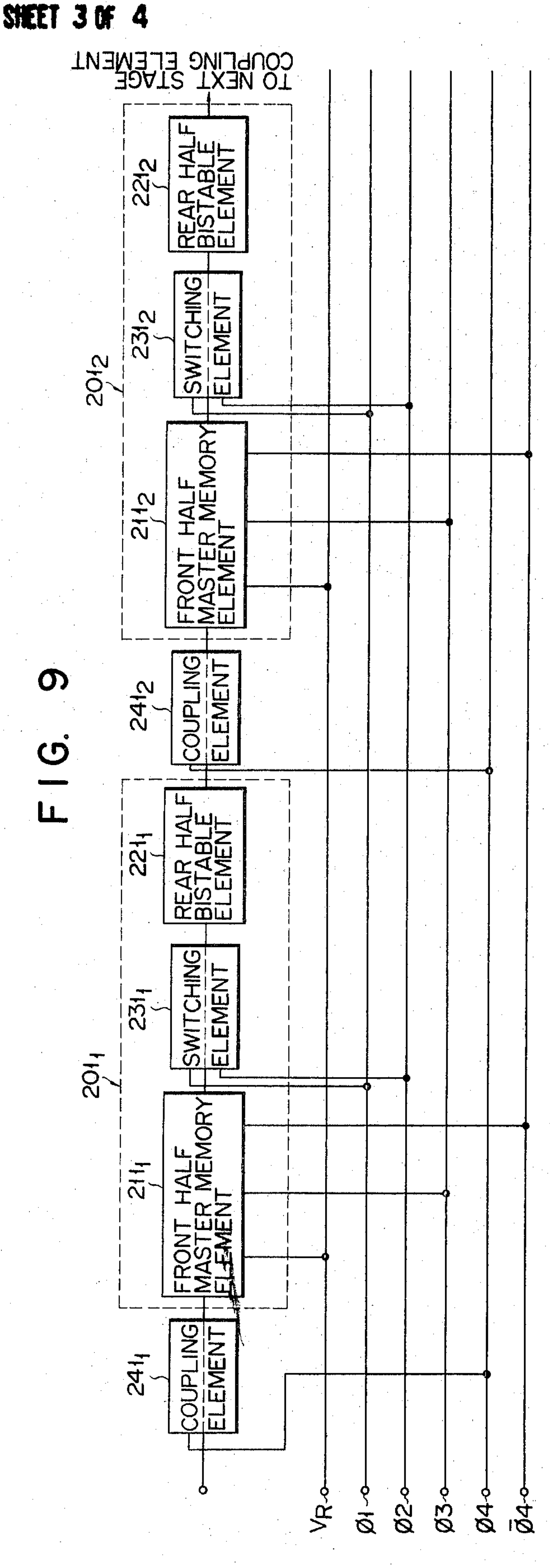
FIG. 9

PATENTED AUG 20 1974 3,831,155

SHEET 4 OF 4

NONVOLATILE SEMICONDUCTOR SHIFT REGISTER

BACKGROUND OF THE INVENTION

The present invention relates to a semiconductor shift register and more particularly to a nonvolatile semiconductor shift register adapted to semipermanently hold finally sotred information even after the cut-off of a power source.

A conventional semiconductor shift register generally comprises a plurality of cascade arranged flip-flop circuits or temporary storage elements, using a semiconductor element such as an MOSFET (Metal oxide semiconductor field effect transistor) having no function for holding a stored information after the interception of a power source. According to the shift register so constructed, when the power source is cut off, the stored information entirely disappears and cannot be reproduced upon the resupply of the power source. For this reason, when information before the cut-off of the power source is again required, the information must be rewritten into the register. As a result, for example, in a sequence shift register such as a large capacity serial shift register, magnetic drum or disc in whice inputs are sequentially entered, a lengthy rewriting time is required. Even when it is unnecessary to shift a stored information, a continued supply of power source is required to hold the stored information with the result that a power consumption is inevitably involved.

As a single flip-flop circuit there has already been proposed a so-called backup type flip-flop circuit having an arrangement illustrated in FIG. 1 in which the information written before the cut-off of the power source can be held after the isolation or cut-off of the power source, The flip-flop circuit uses, as a switching element of each flip-flop half section, MOSFET's $Q_1$, $Q_2$ and, as load resistors for these MOSFET's $Q_1$ and $Q_2$, insulated gate nonvolatile semiconductor elements (hereinafter referred to as "MISFET") $Q_{11}$ and $Q_{12}$ to be later described. As such as MISFET there are known, for example, an MNOS (metal-nitride-oxide-semiconductor) FET and MAOS (metal-alumina-oxide-semiconductor) FET. To explain the MNOSFET by way of example, use is made, in place of a gate insulating film of a conventional MOSFET, an overlapped thin silicon oxide ($SiO_2$)-silicon nitride ($Si_3N_4$) film structure in which a gate threshold voltage $V_T$ is varied in a binary fashion by trapping and releasing electric charges at the interface between the silicon oxide film and the silicon nitride film.

FIG. 2 is a diagram curve representing a relation of the gate voltage $V_G$ to the gate threshold voltage $V_T$ of the P-channel MNOSFET utilizing a tunnel effect which is well known to those skilled in the art. As will be evident from FIG. 2 when, for example, a voltage of about +25V is applied to the gate of the P-channel MNOSFET, the gate threshold voltage $V_T$ is shifted in a positive direction and saturated at about +2V (let the saturated gate threshold voltage be represented as $V_{TL}$) and upon application of a gate voltage of about 25V the gate threshold voltage $V_T$ is shifted in a negative direction and saturated at about −8V (let the saturated gate threshold voltage be represented as $V_{TH}$). These two saturated gate threshold voltages $V_{TL}$ and $V_{TH}$ are semipermanently (about ten thousand years) held without supplying a power source from outside.

FIG. 3 is a characteristic curve representation showing a relation of the drain current $I_D$ to the gate voltage $V_G$ of the above-mentioned P-channel MNOSFET. As will be clear from FIG. 3, when a voltage having an appropriate value between the above-mentioned two saturated gate threshold voltages $V_{TL}$ and $V_{TH}$ is applied to the gate of the P-channel MNOSFET, then the presence or absence of the drain current thereof can be read out in a manner to correspond to a binary coded signal "1" or "0." The above-mentioned MAOSFET is operated in substantially the same manner as the aforesaid MNOSFET except that its saturated gate threshold voltages $V_{TL}$ and $V_{TH}$ differ.

The operation of a flip-flop circuit constructed as shown in FIG. 1 is explained below.

When a flip-flop operation is effected through switching MOSFET's $Q_1$ and $Q_2$, both MISFET's $Q_{11}$ and $Q_{12}$ act merely as load resistors for the corresponding switching MOSFET's $Q_1$ and $Q_2$ if the MISFET's are both set, prior to the flip-flop operation, to have the above-mentioned positive saturated gate threshold voltage $V_{TL}$ by applying the aforesaid voltage of about +25V to a common gate of the MISFET's. At this time, the voltage being applied to the common gate of both MISFET's is only required to be negative as against the positive saturated gate threshold voltage $V_{TL}$ (in this case, about +2V). For practical application, therefore, said common gate has only to be impressed with a zero volt. After the termination of the predetermined flip-flop operation, when the aforesaid voltage $V_G$ of about −25V, is applied to a common gate of the MISFET's $Q_{11}$ and $Q_{12}$, then a binary coded signal "1" or "0" can be stored in either of the MISFET's $Q_{11}$ and $Q_{12}$ according to the operation timing of the switching MOSFET's $Q_1$ and $Q_2$. The final memory state can be held after the cut-off of a power source. That is, when the switching MOSFET $Q_1$ is turned ON and the switching MOSFET $Q_2$ is turned OFF, the MISFET $Q_{11}$ is set at a negative saturated gate threshold voltage $V_{TH}$ and the MISFET $Q_{12}$ maintained at a positive saturated gate threshold voltage $V_{TL}$ and vice versa. If a backup type flip-flop circuit as shown in FIG. 1 is utilized, it is theoretically possible to construct a nonvolatile shift register. In this case, however, the following drawbacks are encountered.

1. If the shift register is constructed as shown in FIG. 1 it is necessary that a voltage different in polarity from a power soruce voltage $V_{DD}$ ($V_{SS}$ usually denotes a ground potential) be applied to the common gate of the MISFET's $Q_{11}$ and $Q_{12}$. After the termination of a predetermined flip-flop operation when it is required that its memory state be maintained it is necessary to supply, from outside, a voltage different from the power supply voltage $V_{DD}$.

2. The MISFET's $Q_{11}$ and $Q_{12}$ do not function as a memory element during the normal flip-flop operation through the switching MOSFET's $Q_1$ and $Q_2$. When the power supply is cut off during the above-mentioned flip-flop operation, its memory information is erased in the same manner as a shift register using a conventional flip-flop circuit and, even when the power source is re-energized, its memory information can not be reproduced.

Accordingly, the object of the present invention is to provide a nonvolatile semiconductor shift register having a relatively simple circuit arrangement and adapted to semipermanently hold memory information after restoration of power after the cut-off of a power source.

SUMMARY OF THE INVENTION

A nonvolatile semiconductor shift register according to the preferred embodiment of this invention is so constructed that each shift register stage comprises a permanent or nonvolatile semiconductor memory element, a temporary or volatile memory element consisting of a conventional bistable or flip-flop circuit and a switching element between the permanent and temporary memory elements. Such shift register stages are cascade connected through respective coupling elements. The nonvolatile semiconductor shift register so constructed is capable of easily shifting any binary coded signal from stage to stage in the same manner as a conventional shift register which comprises a plurality of cascade connected flip-flop circuits; and is capable of semipermanently holding the information stored in the memory permanent element after the cut-off of a power source. As a result, when it is desired to obtain information before the cut-off of a power source an access time for rewriting the information as well as a power consumption is not required as in the case of the above-mentioned conventional shift register.

BRIEF DESCRIPTION OF THE DRAWING

FIGS. 8A to 8E are operational timing charts of the circuitry of FIG. 7;

FIG. 9 is a schematic circuit arrangement of another embodiment according to the present invention;

PREFERRED EMBODIMENTS OF THE INVENTION

Let us now explain in detail preferred embodiments of a nonvolatile semiconductor shift register according to the present invention by reference to the accompanying drawings.

Figure 4:
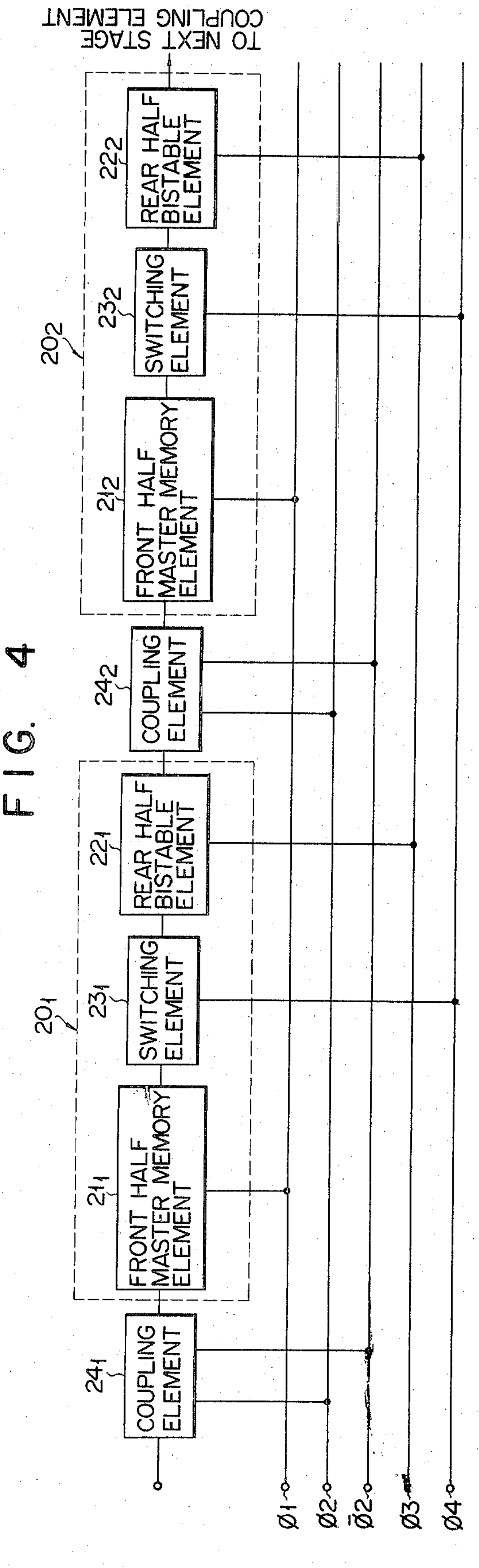
FIG. 4 is a schematic circuit diagram showing one embodiment of a nonvolatile semiconductor shift register according to the present invention.

FIG. 4 shows a schematic circuit diagram according to one embodiment of the present invention. In FIG. 4, a one shift register stage $20_1$ comprises a front half master memory element 21 using the above-mentioned MISFET, a rear half slave memory element $22_1$ using a conventional bistable or flip-flop circuit and a switching element arranged between the master memory element $21_1$ and the slave memory element $21_1$. The next shift register stage $20_2$ comprises a front half master memory element $21_2$, a switching element $23_2$ and a rear half slave memory element $22_2$ arranged in the same manner as the above-mentioned shift register stage $20_1$. A shift register according to the present invention is constructed by cascade connecting a plurality of such shift register stages through the respective coupling elements $24_1$, $24_2$ . . . and controlling by a four- or three-phaseclock pulse system as will be later described, the first stage coupling element having its input supplied with predetermined binary coded signals "1" and "0."

Figure 5:
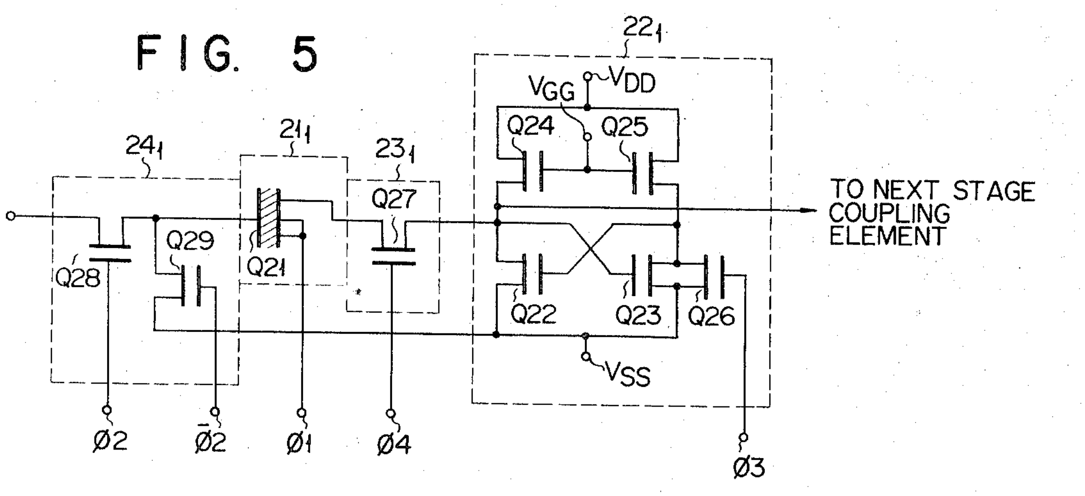
FIG. 5 is a practical circuit arrangement of one stage of the circuitry of FIG. 4 based on a four-phase clock pulse control system.
Figures 6A, 6B, 6C, 6D, 6E, 6F:
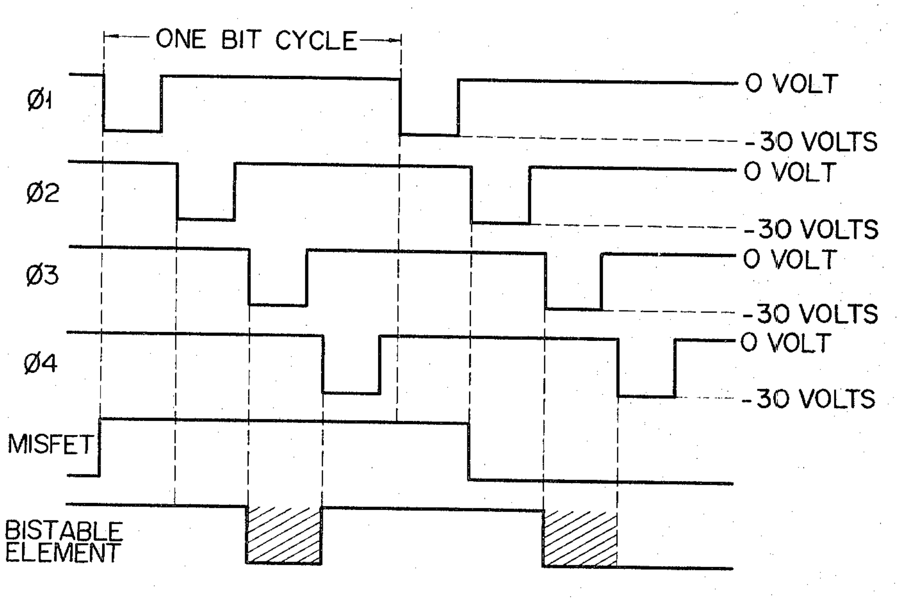
FIGS. 6A to 6F are operational timing charts of the circuitry of FIG. 5.

FIG. 5 shows a practical circuit arrangement (only one stage shown) of the circuitry of FIG. 4 based on a four-phased clock pulse system. In this circuit arrangement the master memory element $21_1$ consists of a P-channel MISFET $Q_{21}$ having a source to which a substrate is connected in common and to which is applied a first phase clock pulse $\phi 1$ as shown in FIG. 6A. The slave memory element $22_1$ comprises of a known direct-coupled flip-flop circuit having two switching MOSFET's $Q_{22}$ and $Q_{23}$ and two MOSFET's $Q_{24}$ and $Q_{25}$; and a set MOSFET $Q_{26}$ having a drain-source path connected in parallel with that of the rear switching MOSFET $Q_{23}$ and having a gate to which is applied a third phase clock pulse $\phi 3$ as shown in FIG. 6C. The switching element $23_1$ consists of a MOSFET $Q_{27}$ having a drain-source path connected across the drain of the MISFET $Q_{21}$ and the drain of the front switching MOSFET $Q_{22}$ included in the flip-flop circuit and having a gate to which is applied a fourth phase clock pulse $\phi 4$ as shown in FIG. 6D. The coupling element $24_1$ comprises a write-in MOSFET $Q_{28}$ having a drain-source path connected across the drain of the rear switching MOSFET included in the preceding flip-flop circuit (not shown) and the gate of the MISFET $Q_{21}$ and having a gate to which is applied a second phase clock pulse $\phi 2$ as shown in FIG. 6B; and an erasing MOSFET $Q_{29}$ having a gate to which is applied an inverted second phase clock pulse $\bar{\phi} 2$, the source of said MOSFET $Q_{29}$ being connected to a normally grounded positive power source $V_{SS}$ and the drain thereof being connected to the gate of the MISFET $Q_{21}$. The above-mentioned MOSFET's $Q_{22}$ to $Q_{29}$ are all of a P-channel type. Let us now explain the operation of the shift register so constructed as shown in FIG. 5 by reference to FIGS. 6A to 6F.

For convenience of explanation, let the state in which the MISFET $Q_{21}$ obtains a voltage $V_{TL}$ by the positive side of a gate threshold voltage $V_T$ of the MISFET be represented by a binary coded numeral "0" and the state in which it obtains a voltage $V_{TH}$ by the negative side of the gate threshold voltage thereof be represented as a binary coded numeral "1"; and let the state in which the front switching MOSFET $Q_{22}$ of the slave memory element $22_1$ is turned ON and the rear switching MOSFET $Q_{23}$ thereof is turned OFF be denoted as a binary coded signal "0" and the state in which the front switching MOSFET $Q_{22}$ is turned OFF and the rear switching MOSFET $Q_{23}$ is turned ON be denoted as a binary coded signal "1." Let it be assumed that in FIG. 5 the potential $V_{SS}$ denotes a ground potential (0 volt), the potential $V_{DD}$ about −24 volts and $V_{GG}$ about −30 volts; and that the first to fourth phase clock pulses $\phi 1$ to $\phi 4$ denote a ground potential at the positive side and about −30 volts at the negative side, respectively.

When the first phase clock pulse $\phi 1$ is applied, the source potential of the MISFET $Q_{21}$ is reduced to the aforesaid 30 volts. At this time, the erasing MOSFET $Q_{29}$ is rendered conductive because the inverted second clock pulse $\bar{\phi}2$ is applied to the gate thereof (At this time, the write-in coupling MOSFET $Q_{28}$ is made nonconductive), causing the gate of MISFET $Q_{21}$ to have the ground potential, Since a positive voltage has equivalently been applied to the gate of MISFET $Q_{21}$, an electron is trapped in its gate insulating layer according to the above-mentioned operation principle and its gate threshold voltage is shifted in a positive direction. As a result, an original memory information of the MISFET $Q_{21}$ is erased and a binary coded signal 0 is written (If the preceding memory state corresponds to the binary coded signal 0, then its state is continued in this case). When the second phase clock pulse $\phi 2$ is applied, the write-in MOSFET $Q_{28}$ is rendered conductive and the erasing MOSFET $Q_{29}$ is rendered nonconductive. Thus, when the preceding stage slave memory element is temporarily stored with the binary coded signal 0, the ground voltage (hereinafter referred to as zero volt) is applied to the gate of the MISFET $Q_{21}$. Conversely, when the preceding stage slave memory element is stored with the binary coded signal 1, a negative voltage (for example, −24 volts) is applied to the gate of the MISFET $Q_{21}$. At this time, the first phase clock pulse $\phi 1$ is reduced to zero voltage and, when the gate of the MISFET $Q_{21}$ is impressed with the zero volt, the memory information of the MISFET $Q_{21}$ remains unchanged. Upon application of a negative voltage to the gate of MISFET $Q_{21}$ the electron which has been trapped in the gate insulating layer is released through the now conducted coupling MOSFET $Q_{28}$ and its gate threshold voltage is shifted in the negative direction, thus storing a binary coded signal 1 in the MISFET $Q_{21}$. The operation period covering from the first phase clock pulse to the second phase clock pulse just corresponds to the period in which information of the slave memory element in the preceding shift register stage is shifted to the master memory element 21$_1$ consisting of the MISFET $Q_{21}$, whereby a half bit shift period is attained. During the half bit shift period, the memory information of the slave memory element in the preceding stage is written in the MISFET of each next shift register stage and semipermanently stored. Therefore, this half bit shift period can be called as a percharge period.

When the third phase clock pulse $\phi 3$ is applied the gate of set MOSFET $Q_{26}$ in the slave memory element 22$_1$, the MOSFET $Q_{26}$ is turned ON. Then, the front switching MOSFET $Q_{22}$ is rendered nonconductive and the rear switching MOSFET $Q_{23}$ is rendered conductive. Accordingly, the slave memory element 22$_1$ including the flip-flop circuit is forcibly set in the binary coded numeral 1. Upon application of the fourth phase clock pulse $\phi 4$, the switching MOSFET $Q_{27}$ is turned ON. At this time, since the first phase clock pulse which is applied to the source of the MISFET $Q_{21}$ has a zero volt and the gate thereof is impressed with a zero volt through the conducting MOSFET $Q_{29}$ previously stored in the MISFET $Q_{21}$ corresponds to the binary coded signal 0, then the front switching MOSFET $Q_{22}$ in the slave memory element 22$_1$ is forcibly turned ON and the rear switching MOSFET $Q_{23}$ is turned OFF. As a result, the memory information of the slave memory element 22 $_1$ is changed from the binary coded signal 1 to the binary coded signal 0. On the other hand, if information previously stored in the MISFET $Q_{21}$ corresponds to the binary coded signal 1, the memory information of the slave memory element 22$_1$ remains unchanged and in consequence is maintained at the binary coded signal 1. As a result, the memory information of the MISFET $Q_{21}$ is shifted to the associated slave memory element 22$_1$, whereby one bit shift operation is completed.

FIG. 6E shows the memory information of the MISFET $Q_{21}$ and FIG. 6F shows the output of the flip-flop circuit in the slave memory element.

Figure 1:
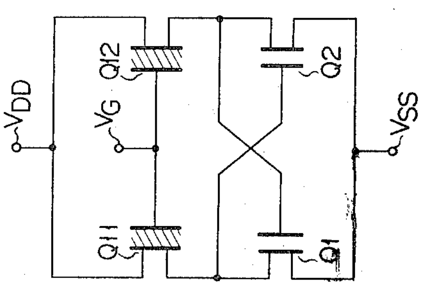
FIG. 1 PRIOR ART
FIG. 1 shows a conventional backup type flip-flop circuit diagram.

According to the shift register so constructed, even when a power source is cut off at any time except the period in which the memory information of the MISFET consitituing the master memory element is erased by the first phase clock pulse $\phi 1$, the information at a given time can be retained in each stage of the MISFET without being extinguished. A once written information can be semipermanently held (about 10,000 years) without supplying an electric power from outside. When no shift operation is required, an average power consumption can be greatly reduced by the cut-off of a power source due to the non-volatility of the shift register. In addition, the stored information at the time of the cut-off of the power source can be reproduced without the necessity of being rewritten. Furthermore, no particular power source, as shown in a circuit of FIG. 1, is required for controlling the gate threshold voltage of the MISFET, with the result that a very effective construction and function can be obtained. Since the flip-flop circuit is provided in the slave memory element, not only a normal shift information but also information having a phase inverted to that of the normal shift information can also be utilized at any time.

The above-mentioned embodiment is so constructed that, in shifting information from the master memory element to the corresponding slave memory element, the flip-flop circuit in the slave memory element is once brought to a set condition by the third phase clock pulse. For this reason, outputs generated during the third phase clock impulse period as shown by hatched sections of FIG. 6F are ineffective, since they are unrelated to the normal shift operation.

Figure 7:
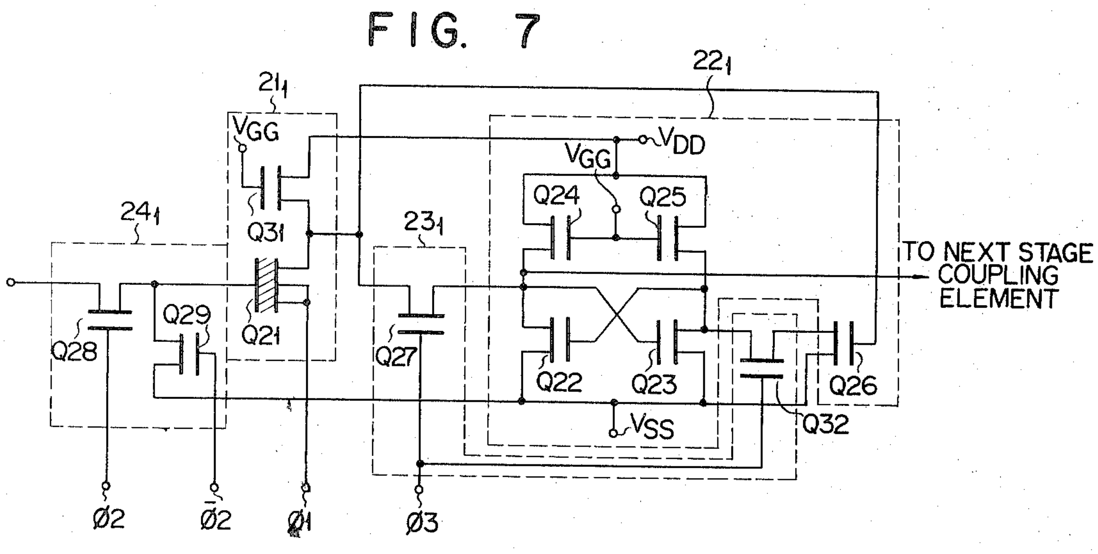
FIG. 7 is another practical circuit arrangement of one stage of the circuitry of FIG. 4 based on a three-phase clock pulse control system.

FIG. 7 is another practical arrangement of the circuitry of FIG. 4 based on a three-phase clock pulse control system and adapted to render outputs effective over the while bit cycle, the above-mentioned drawback thereby eliminating. In this circuit arrangement, the drain of the MISFET $Q_{21}$ is connected, as in the case of the embodiment of FIG. 5, through the drain-source path of the switching MOSFET $Q_{27}$ to the drain of the front switching MOSFET $Q_{22}$ in the flip-flop circuit constituting the slave memory element 22$_1$. The circuit arrangement of FIG. 7 is different from that of FIG. 5 in that the drain of the MISFET $Q_{21}$ is also connected through the drain-source path of an additional P-channel load MOSFET $Q_{31}$ to the negative power source; that the set MOSFET $Q_{26}$ in the flip-flop circuit of the slave memory element 22$_1$ is constituted to be triggered by a drain output of the MISFET $Q_{21}$; that there is provided an additional switching MOSFET $Q_{32}$ having a drain-source path connected between the drain of the MOSFET $Q_{26}$ and the drain of the rear switching MOSFET $Q_{23}$ in the flip-flop circuit and having a gate connected in common with the gate of the switching MOSFET $Q_{27}$; and that a third phase clock pulse $\phi 3$ is applied, in place of a fourth phase clock pulse $\phi 4$ used in the embodiment of FIG. 5, to the common gate of the switching MOSFET's $Q_{27}$ and $Q_{32}$.

Let us explain the operation of the circuitry of FIG. 7 by reference to operational timing charts of FIGS. 8A to 8C.

During the period of applying first and second phase clock pulses $\phi 1$ and $\phi 2$ as shown in FIGS. 8A and 8B, information of the slave memory element in a preceding shift register stage (not shown) is shifted, as in the embodiment of FIG. 5, to the master memory element $21_1$ including the MISFET $Q_{21}$. Upon application of the third phase clock pulse $\phi 3$ as shown in FIG. 8C, the two switching MOSFET's $Q_{27}$ and $Q_{32}$ are simultaneously turned ON. At this time, if a memory information of the MISFET $Q_{21}$ corresponds to the binary coded signal 1, i.e., the MISFET $Q_{21}$ is turned OFF, then the switching MOSFET $Q_{26}$ is turned ON. As a result, in the flip-flop circuit of the slave memory element $22_1$, the front switching MOSFET $Q_{22}$ is turned OFF and the rear switching MOSFET $Q_{23}$ is turned ON, thus causing a binary coded signal 1 to be stared in the slave memory element $22_1$. In the contrary, when a memory information of the MISFET $Q_{21}$ corresponds to the binary coded signal 0 and in consequence the MISFET is made conductive, the switching MOSFET $Q_{26}$ is maintained at the OFF condition. As a result, in the flip-flop circuit of the slave memory element $22_1$, the rear switching MOSFET $Q_{23}$ is turned OFF through the conducted MISFET $Q_{21}$ and switching MOSFET $Q_{27}$ and the front switching MOSFET $Q_{22}$ is turned ON, thus causing a binary coded signal 0 to be written in the slave memory element $22_1$. In this way, upon application of the third phase clock pulse $\phi 3$, a memory information of the associated MISFET $Q_{21}$ is shifted irrespective of any preceding condition to the corresponding slave memory element $22_1$. FIGS. 8D and 8E show the operating states of the MISFET $Q_{21}$ and slave memory element $22_1$, respectively. The shift register constructed as shown in FIG. 7 has the advantage of reducing the number of clock pulses necessary for shifting operations to the first to third phase clock pulses $\phi 1$ to $\phi 3$ included in the four clock pulses $\phi 1$ and $\phi 4$ used in the embodiment of FIG. 5 exclusing the fourth one, because an output information of each MISFET $Q_{21}$ is utilized for not only writing in the associated slave memory element $22_1$ as in the embodiment of FIG. 5 but also triggering the MOSFET $Q_{26}$ in the flip-flop circuit of the slave memory element. As the result, the embodiment of FIG. 7 does not present any ineffective period, as shown by the hatchings of FIG. 6, encountered in the embodiment of FIG. 5.

FIG. 9 shows a schematic block circuit diagram in which use is made, as a rear half slave element in each shift register state, of the later described stray capacitance in place of the flip-flop circuit used in the embodiments of FIGS. 5 and 7.

With this embodiment, a first shift register stage comprises a front half master memory element $211_1$ including the above-mentioned MISFET, a rear half slave memory element $221_1$ consisting of a stray capacitance to be later described, and a switching element $231_1$ arranged between the master memory element and the slave memory element. A second shift register stage is constructed of a cascade connected circuit consisting of a front half master memory element $211_2$ including the above-mentioned MISFET, a switching element $231_2$ and a rear half memory element 221 using a stray capacitance. Such shift register stages are cascade connected through respective coupling elements $241_1$, $242_2$ . . . to provide a shift register which is controlled by four-phase clock pulses $\phi 1$ to $\phi 4$ and a readout voltage $V_R$ to be later described, respectively.

Figure 10:
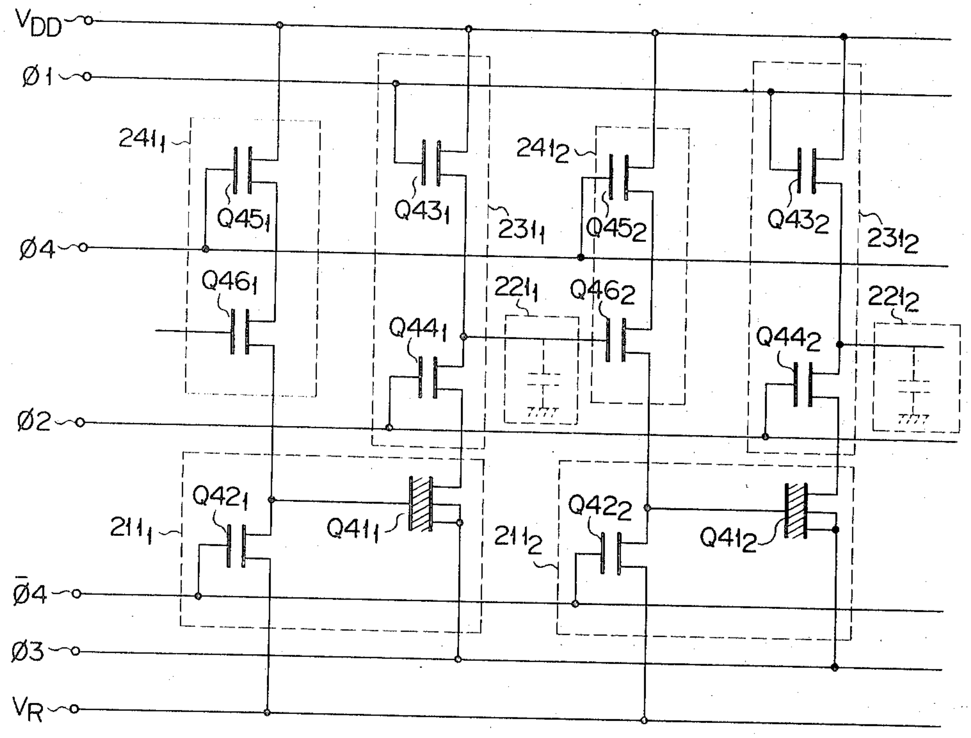
FiG. 10 is a practical circuit arrangement of each part of the circuitry of FIG. 9.
Figures 11A, 11B, 11C, 11D, 11E, 11F, 11G, 12:
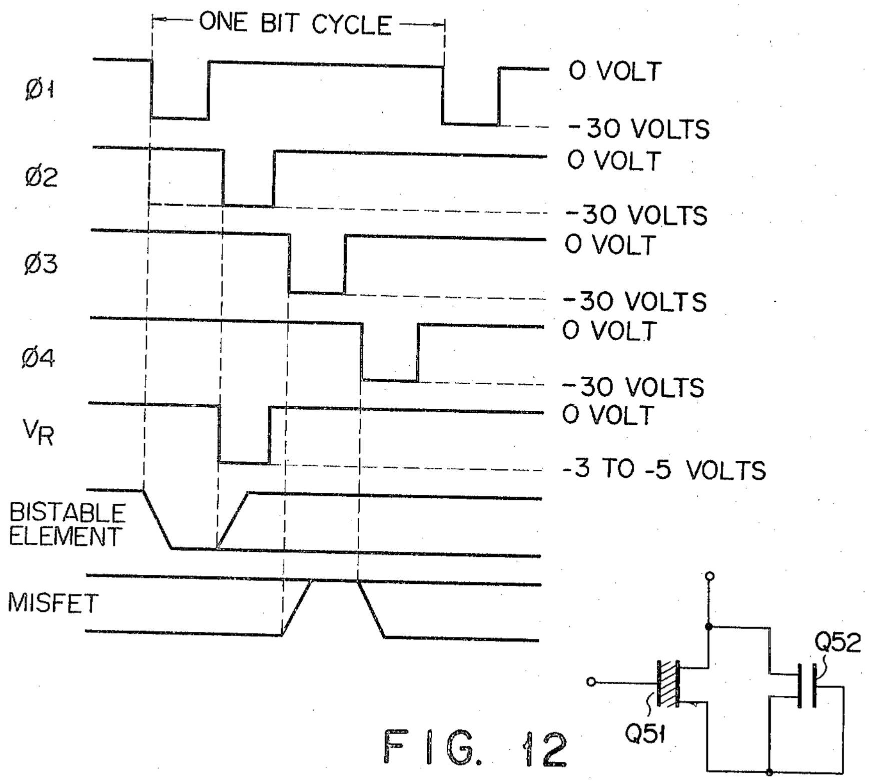
FIGS. 11A to 11G are operational timing charts of the circuitries of FIGS. 9 and 10.
FIG. 12 is a view showing the essential part of a practical circuit arrangement of the essential part of the subject shift register using an N-channel MISFET formed by an avalanche-tunnel injection method in place of each P-channel MISFET in FIGS. 5, 7 and 10.

FIG. 10 is a practical circuit arrangement of the circutry of FIG. 9. In FIG. 10, the master memory element $211_1$, $211_2$ . . . each comprise a P-channel MISFET $Q41_1$ or $Q41_2$ . . . having a source which is connected in common with the substrate thereof and to which is applied a third phrase clock pulse $\phi 3$ as shown in FIG. 11C, and a readout MOSFET $Q42_1$ or $Q42_2$ . . . having a drain connected to the gate of the associated MISFET, having a gate to which is applied a clock pulse $\bar{\phi}4$ with a phase inverted to that of a fourth phase clock pulse $\phi 4$ as shown in FIG. 11D, and having a source to which is applied a readout voltage $V_R$ as shown in FIG. 11E. The switching elements $231_1$, $231_2$ . . . each comprise two P-channel MOSFET's $Q43_1$ – $Q44_1$ or $Q43_2$ – $Q44_2$ . . . in which the respective drain-source paths are connected between the drain of the associated MISFET and a negative power source $V_{DD}$. Applied to the gate of one, for example, $Q43_1$ or $Q43_2$ of the two switching MOSFET's is a first phase clock pulse $\phi 1$ as shown in FIG. 11A, and applied to the gate of the other switching MOSFET $Q44_1$ or $Q44_2$ is a second phase clock pulse $\phi 2$ as shown in FIG. 11B. The coupling elements $241_1$, $241_2$ . . . each comprise two P-channel MOSFET's $Q45_1$ – $Q46_1$, or $Q45_2$ – $Q46_2$ . . . in which the respective drain-source paths are connected between the negative power source $V_{DD}$ and the drain of the associated readout MOSFET included in the respective master memory elements. The gate of one, for example, $Q45_1$ or $Q45_2$ of the two coupling MOSFET's is impressed with the fourth phase clock pulse $\phi 4$ as shown in FIG. 11D, and the gate of the other coupling MOSFET $Q46_1$ or $Q46_2$ is connected to the drain of the other switching MOSFET $Q44_1$ or $Q44_2$ having a gate to which is applied the second phase clock pulse $\phi 2$. As a stray capacitance constituting each slave memory element use is made of a stray capacitance present between the drain of the other associated switching MOSFET and the ground as well as between the gate of the other next stage coupling MOSFET and the ground.

Let us explain the operation of a shift register so constructed as shown in FIG. 10 by reference to FIGS. 11A to 11G.

Figure 2:
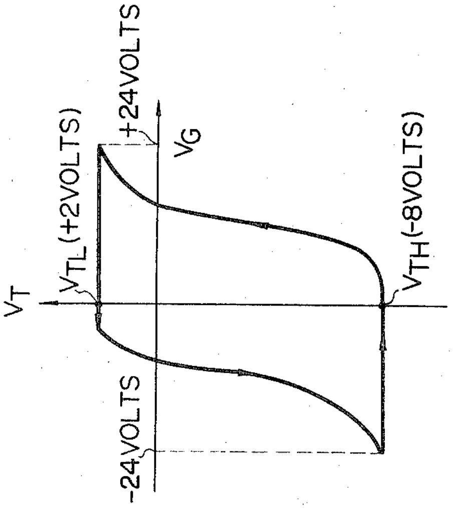
FIGS. 2 and 3 are curve diagram representing the relationship of a gate voltage $V_G$ of a P-channel MNOSFET to the gate threshold voltage $V_T$ thereof, and that of the gate voltage $V_G$ to a drain current $I_D$.
Figure 3:
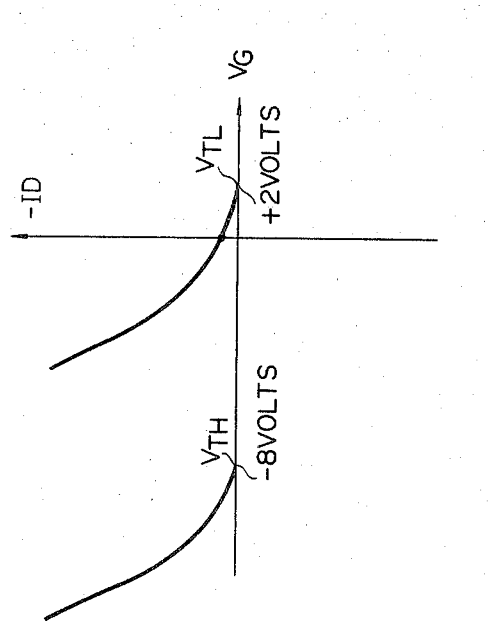

Upon application of the first phase clock pulse $\phi 1$ the switching MOSFET's $Q43_1$ and $Q43_2$ are simultaneously made conductive to cause a voltage of the negative power source $V_{DD}$ (about −24 V) to be charged through the corresponding now conducted switching MOSFET's $Q43_1$ and $Q43_2$ in the respective stray capacitances $221_1$ and $221_2$. Upon application of the second phase clock pulse $\phi 2$ the switching MOSFET's $Q44_1$ and $Q44_2$ are simultaneously rendered conductive. At that time, the gate of each of the readout MOSFET's $Q42_1$ and $Q42_2$ included in the respective master memory elements $211_1$ and $211_2$ is supplied with the phase clock pulse $\bar{\phi}4$ having a phase inverted to that of the fourth phase clock pulse $\phi4$ and the source of each of the readout MOSFET's $Q42_1$ and $Q42_2$ is impressed with the readout voltage $V_R$. As the readout voltage $V_R$ use is made of a voltage having an appropriate value between the positive saturated gate threshold voltage $V_{TL}$ (about +2 V) and the negative saturated gate threshold voltage $V_{TH}$ (about −8 V) of the MISFET's $Q41_1$ and $Q41_2$ as explained in connection with FIG. 2. For this reason the respective readout MOSFET's $Q42_1$ and $Q42_2$ are simultaneously rendered conducting. At this time, if a binary coded signal 0 is stored in the MISFET $Q41_1$ or $Q42_2$, the MISFET is turned ON under the control of a voltage applied through the associated conducting readout MOSFET $Q42_1$ or $Q42_2$ to the gate of the MISFET. As a result, electric charge in the stray capacitance is discharged through the corresponding conducting switching MOSFET and MISFET $Q44_1$ – $Q41_1$ or $Q44_2$ – $Q41_2$. In contrast, if a binary coded signal 1 is stored in the MISFET $Q41_1$ or $Q41_2$ the MISFET is maintained at the "OFF" state even upon application of the readout voltage $V_R$ to the gate of the MISFET through the corresponding readout MOSFET. For this reason, electric charge in the stray capacitance $221_1$ or $221_2$ is not discharged. In this way, memory information in the MISFET $Q41_1$ or $Q41_2$ is shifted, in the form of the presence or absence of the electric charge in the associated stray capacitance $211_1$ or $211_2$, during the first and second phase clock pulse ($\phi1$, $\phi2$) application period. This half bit shift period may be called as a precharge period. Suppose that, in this case, the voltage of the negative power source $V_{DD}$ is charged in the stray capacitance $221_1$ or $221_2$. Then, the charged voltage is discharged through the backward P-N junction between the substrates and the sources of two associated switching MOSFET's as well as between the substrates and the drains thereof. Since the backward P-N junction has a very high resistance, a discharge time constant amounts to be of the order of more than several milliseconds. With the above description the second phase clock pulse $\phi2$ is applied after the first phase clock pulse $\phi1$ is applied, but the second phase clock pulse $\phi2$ may be applied simultaneously with the first phase clock pulse $\phi1$ as indicated by a dotted line in FIG. 11B. In this case, since the two switching MOSFET's $Q43_1$ – $Q44_1$ or $Q43_2$ – $Q44_2$ are simultaneously turned ON, and the voltage of the negative power source is charged, through the two associated conducting switching MOSFET's not only in the stray capacitance $221_1$ or $221_2$ but also in the stray capacitance present between the ground and the drain of each associated MISFET. As a result, a DC conducting path is established. This involves an increased power consumption. However, this disadvantage is well offset by the advantage that the decaying in level of the electric charge in the stray capacitance $221_1$ or $221_2$ can be reduced.

Upon application of the third phase clock pulse $\phi3$, the source of the MISFET $Q41_1$ or $Q41_2$ has a negative voltage (about −30 V). This this time, the readout voltage $V_R$ is a zero volt and the zero volt is applied to the gate of each MISFET through the corresponding conducted readout MOSFET. It means that a positive voltage has been applied equivalently between the gate and the source of the MISFET $Q41_1$ or $Q41_2$. For this reason an electron is trapped, based on the principle as mentioned above, in the gate insulating film of the MISFET $Q41_1$ or $Q41_2$ and the gate threshold voltage thereof is shifted to the positive direction, causing a binary coded signal 0 to be written in the MISFET $Q41_1$ or $Q41_2$ (If in this case, the preceding memory state of the MISFET corresponds to the binary coded signal 0, then its state is maintained).

Upon application of the fourth phase clock pulse $\phi4$ the coupling MISFET's $Q45_1$ and $Q45_2$ are simultaneously turned ON. At this time, if the voltage of the negative power source $V_{DD}$ is charged in the stray capacitance $221_1$ or $221_2$, then the succeeding stage coupling MOSFET $Q46_2$ is turned ON, and in consequence applied to the gate of the succeeding stage MISFET $Q41_2$ the voltage of the negative power source $V_{DD}$ is through the two associated conducting coupling MOSFET's $Q45_2$ -$Q46_2$. As a result, a threshold voltage of the MISFET is shifted to the negative direction, causing a binary coded signal 1 to be written in the MISFET. In the absence of a negative electrical charge in the stray capacitance $221_1$ or $221_2$, on the other hand, the succeeding stage coupling MOSFET $Q46_2$ is maintained at the "OFF" state and in consequence applied to the gae of the other succeeding stage MISFET $Q41_2$ is a zero voltage irrespective of any state of the other succeeding stage coupling MOSFET $Q45_2$. As a result, a binary coded signal 0 has been written in the MISFET $Q41_2$. In this way, a binary coded signal 1 or 0 applied to the gate of the first stage coupling MOSFET $Q46_1$ is shifted from stage to stage through application of the four clock pulse $\phi1$ to $\phi4$ and the memory information in the MISFET $Q41_1$ or $Q41_2$ is semipermanently held even where a power source is cut off.

FIG. 11F shows the memory information in the stray capacitance $221_1$ or $221_2$ each constituting the slave memory element, and FIG. 11G shows the memory information in the MISFET $Q41_1$ or $Q41_2$.

It is needless to say that this invention should not be taken as limitative on the above-mentioned embodiments, but it will be evident that it can be applied to a substantially equal technical concept. In the embodiments, however, for example, MISFET's are used as the respective front half master memory elements and flip-flop circuits or stray capacitances are used as the rear half memory elements, but even when its relation is reversed, it will be evident to those skilled in the art that it can also be put to practical use with the same result. In this case, with the circuit arrangements of FIGS. 4, 5, 9 and 10 clock pulses are applied in the sequence of $\phi3$, $\phi4$, $\phi1$, $\phi2$ and with the circuit arrangement of FIG. 7 clock pulses are applied in the order of $\phi3$, $\phi1$, $\phi2$. Furthermore, MISFET's utilizing an "avalanchetunnel injection method" may be used instead of the aforesaid MISFET's utilizing a tunnel effect. Furthermore, the P-channel MOSFET's and P-channel MISFET's used in the embodiments of FIGS. 5, 9 and 10 may be replaced by N-channel MOSFET's and N-channel MISFET's Q51 (only one is shown in FIG. 12). In this case, a positive power source is used instead of the negative power source $V_{DD}$, the phase of the clock pulses $\phi1$ to $\phi4$ is required to be inverted, and there should be further provided an N-channel MOSFET Q52 (see FIG. 12) having a drain-source path connected parallel with that of the N-channel MISFET Q51, without necessity of connecting the substrates of the respective P-channel MISFET's to the sources thereof.

What we claim is:

1. A shift register formed of a plurality of cascade arranged shift register stages, and which is capable of retaining information stored therein before a power supply cut-off after restoration of the power without requiring that the information be rewritten into the shift register each stage of said shift register comprising:

a coupling element whose input is supplied with any binary coded signal;

a permanent or nonvolatile semiconductor memory element whose input is coupled with the output of said coupling element;

a switching element whose input is coupled with the output of said nonvolatile semiconductor memory element;

a temporary or volatile memory element whose input is coupled with the output of said switching element; and a signal shifting means for shifting information previously stored in a given stage nonvolatile semiconductor memory element, after being temporarily stored in the associated volatile memory element, to the succeeding stage nonvolatile semiconductor memory element.

2. A shift register as claimed in claim 1 wherein said non-volatile semiconductor memory element comprises a nonvolatile insulated gate field effect transistor and said volatile memory element comprises a flip-flop circuit.

3. A shift register as claimed in claim 1 wherein said non-volatile semiconductor memory element comprises a nonvolatile insulated gate field effect transistor and said volatile memory element comprises a capacitance.

4. A shift register as claimed in claim 1 wherein:

said nonvolatile semiconductor memory element comprises a nonvolatile insulated gate field effect transistor (MISFET) having a source connected in common with the substrate thereof and impressed with a first phase clock pulse; said volatile memory element comprises a flip-flop circuit including two switching metal oxide semiconductor field effect transistors (MOSFET's) having gates cross-coupled to each other, two load MOSFET's each having a drain-source path connected in series with that of the associated one of said two switching MOSFET's and a set MOSFET having a drain-source path connected in parallel with that of one of said two switching MOSFET's and having a gate impressed with a third phase clock pulse;

said coupling element comprises a first coupling MOSFET having a drain-source path connected between the gate of said MISFET and a first stage binary coded input signal source of the preceding stage volatile memory element output and having a gate impressed with a second phase clock pulse, and a second coupling MOSFET having a drain-source path connected between the gate of said MISFET and the predetermined one of positive and negative power sources and having a gate impressed with a clock pulse of a phase inverted relative to that of said second phase clock pulse; and said switching element comprises a MOSFET having a drain-source path connected between the drain of said MISFET and the drain of the other switching MOSFET included in said flip-flop circuit and having a gate impressed with a fourth phase clock pulse, said first to fourth phase clock pulses constituting a one bit cycle.

5. A shift register as claimed in claim 1 wherein:

said nonvolatile semiconductor memory element comprises a nonvolatile insulated gate field effect transistor (MISFET) having a source connected in common with the substrate and impressed with a first phase clock pulse, and a load metal oxide semiconductor field effect transistor (MOSFET) having a drain-source path connected in series with that of said MISFET;

said volatile memory element comprises a flip-flop circuit including two switching MOSFET's having cross-coupled gates, two load MOSFET's each having a drain-source path connected in series with that of the associated one of said two switching MOSFET's, and a set MOSFET having a drain-source path coupled in parallel with that of one of said two switching MOSFET's and having a gate connected to the drain of said MISFET;

said coupling element comprises a first coupling MOSFET having a drain-source path connected between the gate of said MISFET and a first stage binary coded input signal source or the preceding stage binary element output and having a gate impressed with a second phase clock pulse, and a second coupling MOSFET having a drain-source path connected between the gate of said MISFET and the predetermined one of positive and negative power sources and having a gate impressed with a clock pulse of a phase inverted relative to that of said second phase clock pulse; and said switching element comprises a first switching MOSFET having a drain-source path connected between the drain of said MISFET and the drain of the other switching MOSFET included in said flip-flop circuit and having a gate impressed with a third phase clock pulse, and a second switching MOSFET having a drain-source path connected between the drains of the other switching MOSFET and said set MOSFET including in said flip-flop circuit and having a gate connected in common with that of said first switching MOSFET, said first to third phase clock pulses constituting a one bit cycle.

6. A shift register as claimed in claim 1 wherein:

said switching element comprises two switching metal oxide semiconductor field effect transistors (MOSFET) having drain-source paths connected in series with each other, one of said two switching MOSFET's having a gate impressed with a first phase clock pulse and the other switching MOSFET having a gate impressed with a second phase clock pulse;

said coupling element comprises two coupling MOSFET's having drain-source paths connected in series with each other, one of said two coupling MOSFET's having a gate impressed with a fourth phase clock pulse and the other coupling MOSFET having a gate connected to a first stage binary coded input signal source or the drain of the other switching MOSFET included in the preceding stage switching element;

said nonvolatile semiconductor memory element comprises a nonvolatile insulated gate field effect transistor (MISFET) having a drain-source path connected in series with that of the other switching MOSFET included in the associated switching element and having a substrate connected in common with the source thereof and impressed with a third phase clock pulse, and a readout MOSFET having a drain-source path connected in series with that of the other coupling MOSFET included in the associated coupling element and having a gate impressed with a clock pulse of a phase inverted relative to that of, said fourth phase clock pulse, the source of said readout MOSFET being impressed with a voltage of a predetermined value between positive and negative gate threshold voltages of said MISFET: and said volatile memory element comprises a stray capacitance present between the gate of the other coupling MOSFET included in the succeeding stage coupling element and ground as well as between the drain of the other switching MOSFET included in the associated switching element and ground, said first to fourth phase clock pulses constituting a one bit cycle.

* * * * *